US007791452B2

(12) United States Patent
Carrieri

(10) Patent No.: US 7,791,452 B2
(45) Date of Patent: Sep. 7, 2010

(54) WIRELESS ACCESS CONTROL AND EVENT CONTROLLER SYSTEM

(75) Inventor: Michael A. Carrieri, Amityville, NY (US)

(73) Assignee: Alarm Lock Systems, Inc., Amityville, NY (US)

( * ) Notice: Subject to any disclaimer, the term of this patent is extended or adjusted under 35 U.S.C. 154(b) by 1540 days.

(21) Appl. No.: 11/087,975

(22) Filed: Mar. 23, 2005

(65) Prior Publication Data

US 2006/0214767 A1 Sep. 28, 2006

(51) Int. Cl.
*H04L 9/32* (2006.01)

(52) U.S. Cl. ......................... 340/5.6; 340/540; 340/5.3; 340/541

(58) Field of Classification Search .................. 340/5.6, 340/5.51, 5.7, 5.74, 5.81, 540, 5.3, 541
See application file for complete search history.

(56) References Cited

U.S. PATENT DOCUMENTS 5,479,151 A * 12/1995 Lavelle et al. ............... 340/542
5,936,544 A 8/1999 Gonzales et al.
6,029,247 A * 2/2000 Ferguson ....................... 726/5
6,574,266 B1 * 6/2003 Haartsen ..................... 375/133
6,720,861 B1 * 4/2004 Rodenbeck et al. ......... 340/5.64
6,748,061 B2 * 6/2004 Ahlstrom et al. ....... 379/102.06

* cited by examiner

*Primary Examiner*—Vernal U Brown
(74) *Attorney, Agent, or Firm*—John R. Mugno

(57) ABSTRACT

A wireless access control system and method is described which permits wireless communication between a remote access controller and a central access controller on an "on demand" basis. The remote access controller can determine the state of the locking mechanism without communication to the central access controller when a valid access request is presented. However, if an invalid access request is presented, a remote wireless communicator will be placed in its transmission mode to request updated user control data from the central access controller. The remote wireless communicator can also be placed in its transmission mode to request updated user control data from the central access controller by a communication command input at a remote programming mode device.

7 Claims, 5 Drawing Sheets

WIRELESS ACCESS CONTROL AND EVENT CONTROLLER SYSTEM

FIELD OF THE INVENTION

This invention is generally directed to a wireless access control system having a remote access controller that is able to wirelessly communicate with a central access controller to control access to a locking mechanism coupled to the remote access controller. More specifically, the wireless access control system of the present invention provides for "on demand" communication between the remote access controller and the central access controller in a manner to minimize energy consumption, while, at the same time, providing an efficiently fast status signal (e.g., locked or unlocked) at the remote location for the locking mechanism. The wireless transmission of access control data between the remote access controller and the central access controller can be effectuated by (i) an invalid access request signal at the remote access controller, (ii) a communication command input at a remote programming mode device that is coupled to said remote access controller, (iii) the expiration of a timer coupled to said remote access controller; and (iv) the activation of a transducer that is coupled to the remote access controller by a transducer stimulator located remotely from the transducer. The transducer stimulator may be controlled by the central access controller, but can also be separately operated.

BACKGROUND OF THE INVENTION

The present invention relates to an access control system. More particularly, the present invention relates to an access control system that typically connects a plurality of remote locking mechanisms to a central access controller.

The need to control access to secured premises has resulted in a long history of access control devices. Traditionally, simple mechanical locks were incorporated to prevent access to the premises by unauthorized users. However, in such simple mechanical locking environments, mechanical keys needed to be provided to every authorized user. If the lock were changed, new keys needed to be provided to each authorized user, resulting in confusion and undue expense. Such mechanical locks were particularly undesirable in the hotel industry wherein a new user might be authorized each day, but wherein prior authorized users should be denied access.

With the advent of less expensive microelectronics, electronic access controllers were developed that could grant access to an authorized user based on the presentation of a credential such as a card key. While the issuance of different card keys was less expensive than the manufacturing of metal keys, such early access control systems still required security professionals to physically adjust authorized codes at each door in a system. In larger installations, this step was both expensive and time-consuming.

In the next development of the access control industry, all locking mechanisms in a system were wired to a central access controller so that the security professional could reprogram each locking mechanism from a central location (e.g., a command and control station). However, wired units tended to be expensive and complex to install in view of the necessity to physically connect each locking mechanism to a remote device by hard wire. Such shortcomings are adequately defined in the Background of the Invention section of Gonzales et al. U.S. Pat. No. 5,936,544 ("the '544 patent"). The '544 patent eliminated the need for hardwiring by coupling wireless communicators to each door module that could communicate with a central access controller. In operation, a user would present a credential to one of the remotely located door modules and the signal associated with that credential would be wirelessly transmitted from the remote location to the central access controller to determine whether the credential represented an authorized user. If an authorized user was indicated, an access control signal granting access would be sent from the central access controller to the remote door module. Conversely, if the user credential was not recognized by the central access controller, an access control signal denying access would be sent from the central access controller to the remote door module The shortcomings of the '544 patent are numerous. For instance, the requirement for communication between a remote door module and the central access controller in every instance where a credential was presented resulted in significant absorption of power. Moreover, if numerous requests were made simultaneously, users would experience substantial delays in achieving access through the remote door module as the central access controller attends to the multitude of requests. Yet another shortcoming of the wireless security control system of the '544 patent is that, should the central access controller experience a breakdown, access to all door modules would be rendered impossible.

Rodenbeck et al. U.S. Pat. No. 6,720,861 ("the '861 patent") overcame some of the battery consumption concerns presented in the '544 patent by providing door access grant or deny decisions at the remote locations, as opposed to requiring a centralized decision. However, this de-centralizing of the locking and unlocking of a door module resulted in other shortcomings. For instance, door modules of the '861 patent could only obtain user updates periodically since a wireless signal would not be transmitted for each event that occurs at the door.

The shortcomings of previous wireless access control systems are evident. In the '544 patent, for instance, battery drain is substantial since each door access grant or deny signal requires communication between the remote location and the central access controller. Conversely, in the system of the '861 patent, grant or deny signals are provided directly at the remote locations, thereby delaying updated user control data from reaching the door control modules. A simple example will demonstrate this flaw. If a new employee is retained and is provided a cardkey at 9:30 AM by security personnel, and then, attempts to use that card key to enter a certain restricted area, access will be denied at that remote location if the system is programmed only to provide updated user control data at midnight of each day. The employee will either need to go back to security personnel or wait until the following day to gain authorized access.

It is therefore a primary object of the present invention to provide a new and improved wireless access control system.

It is another object of the present invention to provide a new and improved wireless access control system that will initiate communication between the remote access control system and the central access control system on a demand basis.

It is yet still another object of the present invention to provide a new and improved wireless access control system that can provide updated access control data from the central access controller to the remote access controller in a non-periodic, on demand manner.

It is still another object of the present invention to provide a new and improved wireless control system which conserves battery power.

It is still another object of the present invention to provide a new and improved wireless access control system that will provide communication between the remote access controller and the central access controller by either (i) an invalid access request signal, (ii) a communication command input at a remote programming mode device coupled to the remote access controller, (iii) activation of a transducer coupled to the remote access controller by a transducer stimulator, or (iv) the expiration of a timer coupled to the remote access controller.

Other objects and advantages of the present invention will become apparent from the specification and the drawings.

SUMMARY OF THE INVENTION

Briefly stated, and in accordance with the preferred embodiments of the present invention, a wireless access control system and method is described which permits wireless communication between a remote access controller and a central access controller on a demand basis. The access control system of the present invention comprises (i) a locking mechanism having a first state and a second state; (ii) a control circuit coupled to the locking mechanism for switching the locking mechanism from the first state to the second state; (iii) an access request receiving device for receiving a user credential and converting the user credential into a access request signal; (iv) a remote access controller coupled to the access request receiving device and adapted to send a status signal to the control circuit; (v) a remote storage device coupled to the remote access controller for maintaining access request data, which will be compared to the access request signal to determine whether the access control signal reflects a valid access request; (vi) a remote programming mode device coupled to the remote access controller; (vii) a remote wireless communicator electrically coupled to the remote access controller and adapted to both transmit and receive access control data, wherein the remote wireless communicator has a standby mode during which no access control data can be received or transmitted, a wake-up listening mode during which access control data can be received, and a transmission mode during which access control data can be transmitted; (viii) a transducer coupled to the remote access controller; (ix) a timer set to a preset value and coupled to the remote access controller; (x) a central access controller located remotely from the remote access controller; (xi) a central wireless communicator coupled to the central access controller and adapted to both transmit to, and receive from, the remote wireless communicator access control data; and (xii) a transducer stimulator, located remotely from the transducer, and for activating the transducer. The remote access controller described above can determine the state of the locking mechanism without communication to the central access controller when a valid access request is presented. However, if an invalid access request is presented, the remote wireless communicator will be placed in its transmission mode to request updated user control data from the central access controller. The remote wireless communicator can also be placed in its transmission mode to request updated user control data from the central access controller by a communication command input at the remote programming mode device. Moreover, the remote wireless communicator can be placed in its wake-up listening mode be either activation of the transducer by the transducer stimulator or expiration of the attached timer.

It will be understood as the description proceeds that various combinations of the aforementioned components can be utilized. Moreover, while the description and the drawings will focus on the use of the remote access controller in the context of a door lock, similar access control systems can be incorporated in controlling the ignition of vehicles, controlling the operation of power tools, controlling access to telecommunication equipment, and controlling access to computer networks.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the description, taken in conjunction with the accompanying drawings, wherein:

DESCRIPTION OF THE PREFERRED EMBODIMENT

Figure 1:
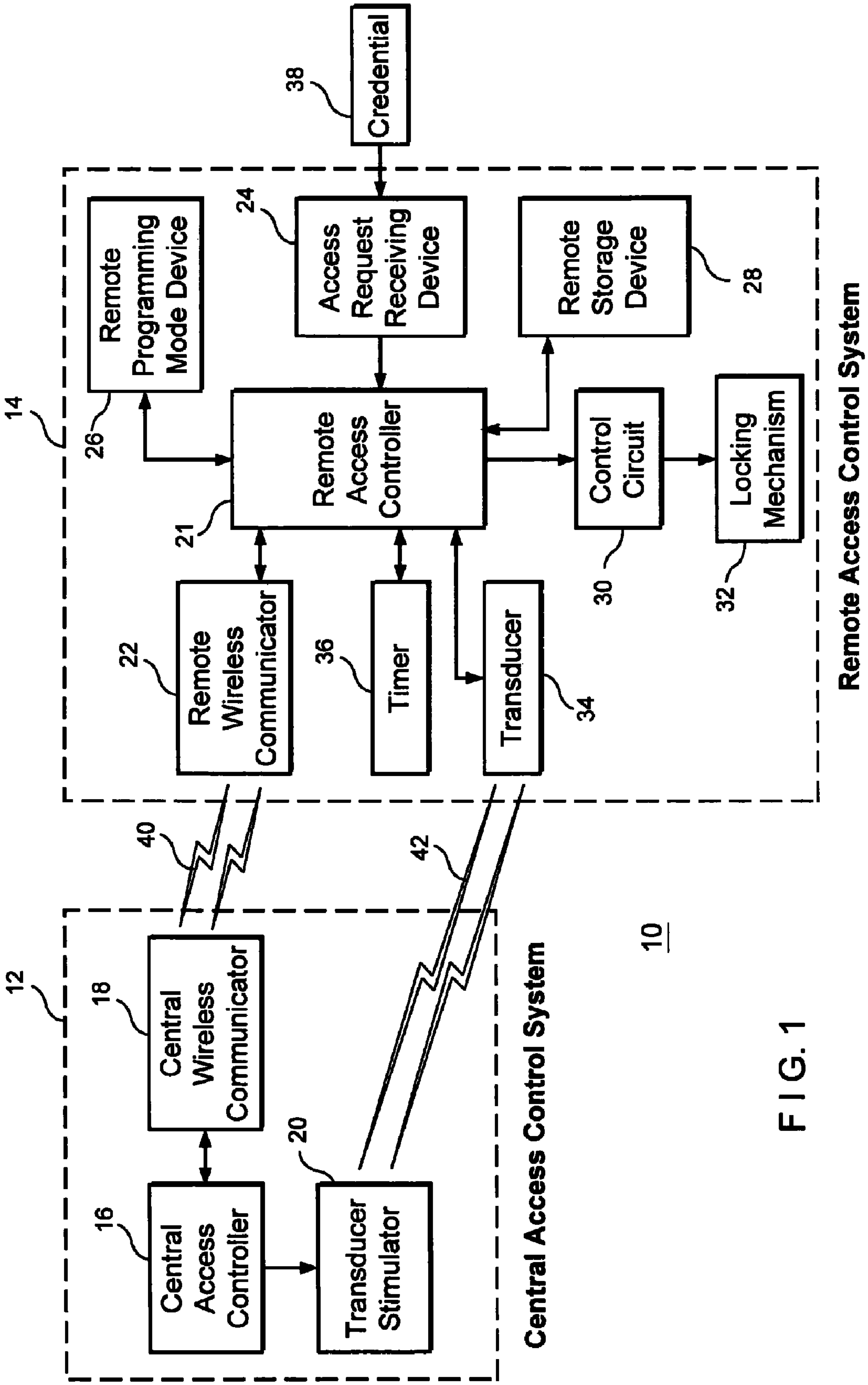
FIG. 1 is a schematic illustration of the overall access control system of the present invention comprising a central access control system and a remote access control system.

Referring first to FIG. 1, a wireless access control system, generally designated 10, is shown which comprises a central access control system 12 and a remote access control system 14. In most real-life applications, it will be readily understood that central access control system 12 will be coupled to a plurality of remote access control systems 14. However, for illustrative purposes, the single representation of remote access control system 14 is sufficient.

Central access control system 12 is comprised of a central access controller 16, a central wireless communicator 18, and a transducer stimulator 20. The components that comprise central access control system 12 are illustrated in a dashed box to illustrate that central access controller 16, central wireless communicator 18, and transducer stimulator 20 can be contained in a composite housing or, alternatively, be separately coupled. In fact, as will become evident below, transducer stimulator 20 can even be remotely located and not coupled to central access controller 16 at all; it need not be a part of central access control system 12.

In operation, central access controller 16 typically comprises software to properly control and operate central wireless communicator 18 and transducer stimulator 20. Security personnel can operate central access controller 16 to provide access control data to, or receive access control data from, remote access control system 14. Although not illustrated, central access controller 16 typically will also be coupled to a memory to maintain a database of permissible users, certain log information, and other user control data relating to remote access control system 14.

Remote access control system 14 is comprised of a remote access controller 21, a remote wireless communicator 22, an access request receiving device 24, a remote programming mode device 26, a remote storage device 28, a control circuit 30, a locking mechanism 32, a transducer 34, and a timer 36. Once again, the components of remote access control system 14 are shown within a dashed box since they may be combined in a single housing or be comprised of separate components.

Access request receiving device 24 can be comprised of numerous known devices such as a card reader, a wireless receiver, a biometric reader, etc. In operation, a person desiring entry through a door secured by locking mechanism 32 will present a credential 38 to access request receiving device 24. It should be understood by those skilled in the art that, while in the past the term "credential" referred solely to a card key or other physical device, the term as used herein reflects the more broader and recent meaning to include biometric readers and the like. Central wireless communicator 18 and remote wireless communicator 22 are capable of wireless communication between each other as reflected by lines 40. Such wireless communication may be made using any wireless technology including, but not limited to, radio frequency (RF) using a a single or a multi-frequency method, RF spread spectrum, infrared, audio, ultrasonic, etc. Moreover, the access control data transmitted between central wireless communicator 18 and remote wireless communicator 22 may (or may not) be packet data and may (or may not) be encrypted. However, regardless of the form of the wireless communications, central wireless communicator 18 and remote wireless communicator 22 will require a power source. In order to conserve power consumption, central wireless communicator 18 and remote wireless communicator 22 will turn the power on only upon a demand based request. The wireless communication between transducer stimulator 20 and transducer 34, as reflected by lines 44, can also take on numerous forms.

Figure 2A:
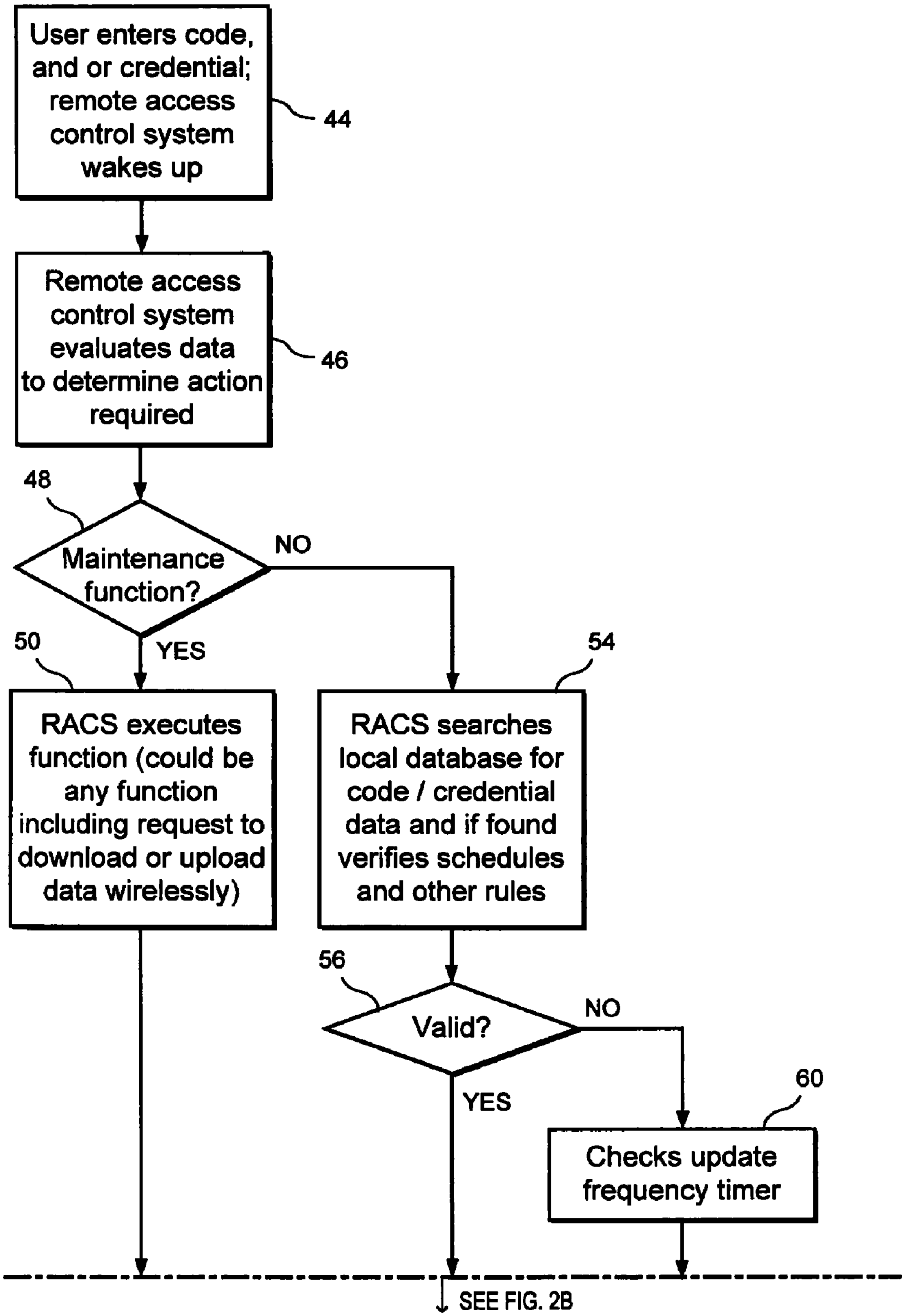
FIG. 2 is a flow chart illustration of the demand based communications and functions of the present inventions when either a credential is presented or a communication command input is entered at a remote programming mode device.
Figure 2B:
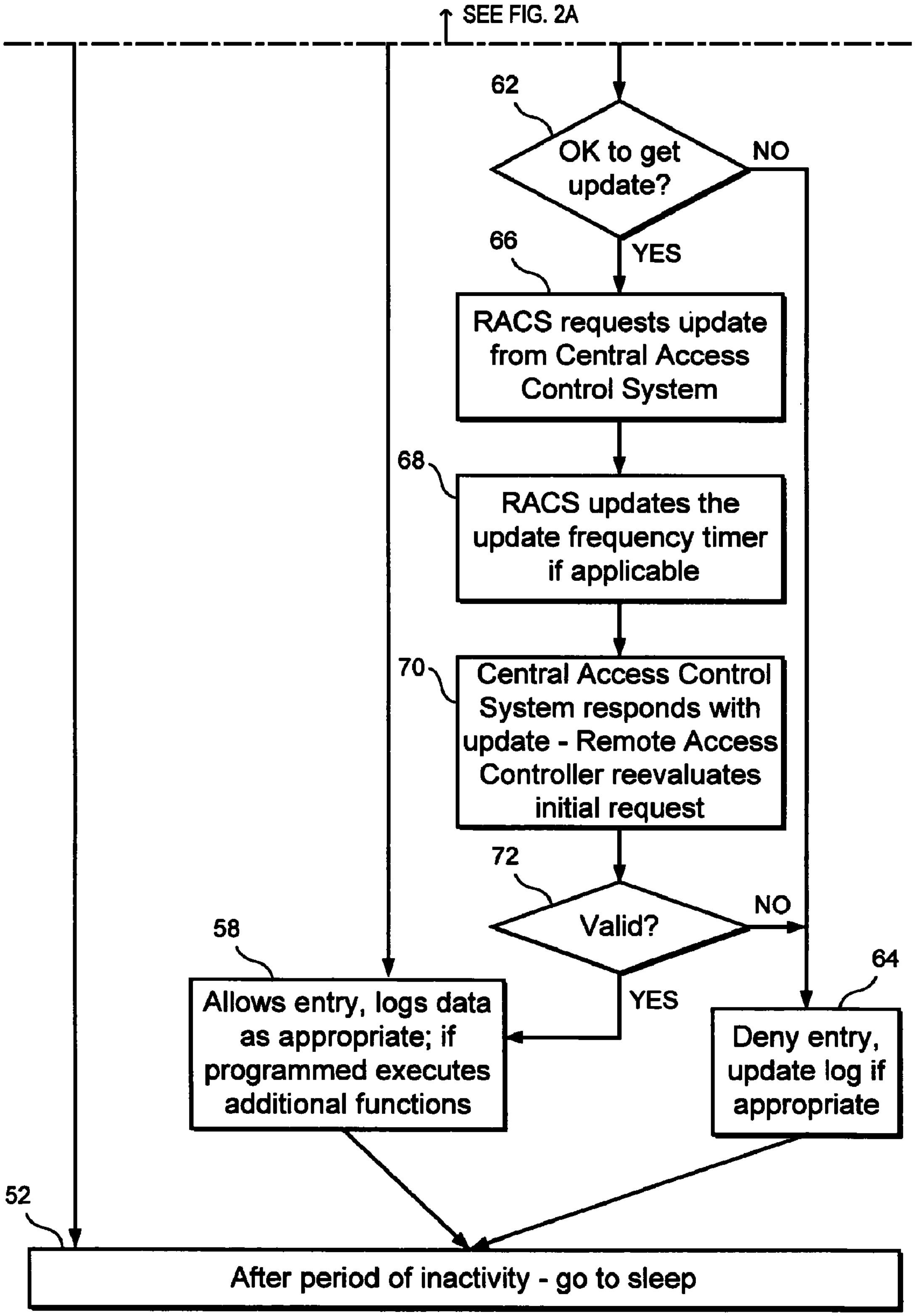
Figure 3:
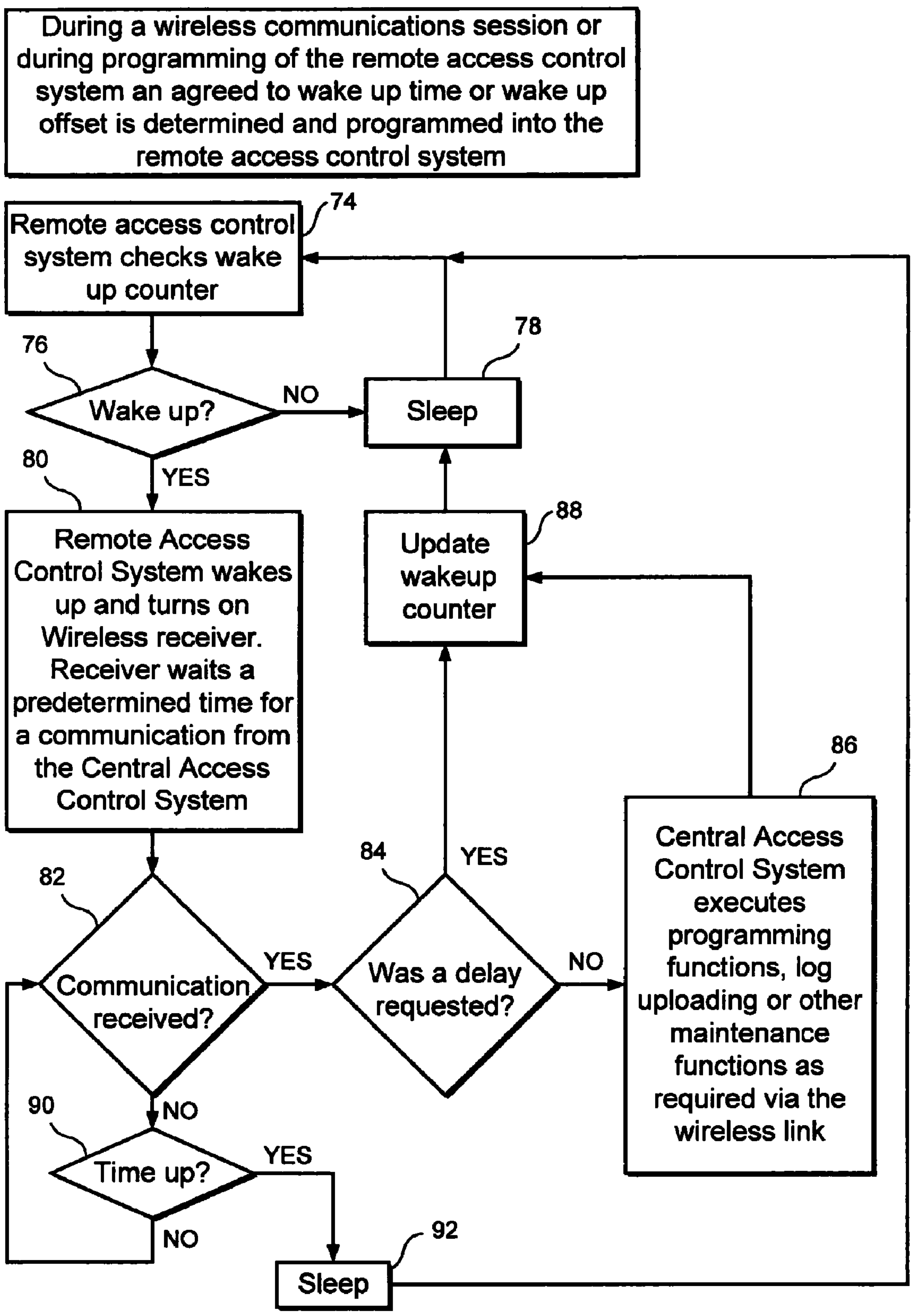
FIG. 3 is a flow chart illustration of a pre-arranged wakeup technique of the present invention, which incorporates the use of a timer.
Figure 4:
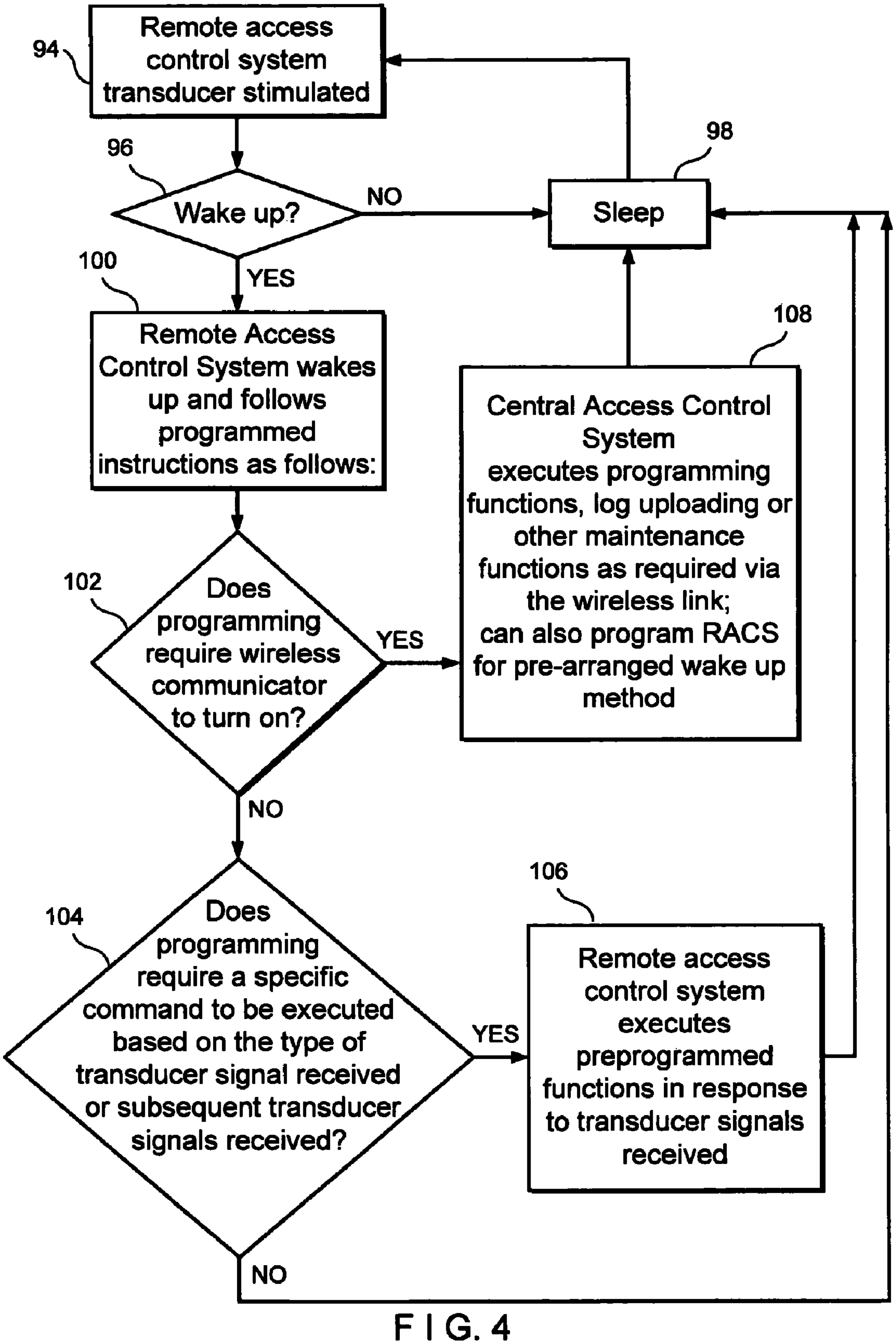
FIG. 4 is a flow chart illustration of the transducer initiated wakeup method of the present invention, which incorporates both a transducer and a transducer stimulator.

The operability of wireless access control system 10 is best understood in conjunction with the flow charts of FIGS. 2-4. Referring first to FIG. 2, the operation of wireless access control system 10 is shown when either a credential 38 is presented to access request receiving device 24 or a command communication is input at remote programming mode device 26. Remote programming mode device 26 can be a plug-in communication port, a wireless receiver, a keypad, or any other means for a programmer to provide command data. Moreover, remote programming mode device 26 can actually be a part of access request receiving device 24, whereby access receiving request device 24 can differentiate between programming data and an access request signal.

The components of wireless access control system 10 are typically placed in a mode to draw minimal power. Referring again to FIG. 2, in box 44, data is presented to remote access control system 14. In box 46, remote access controller 21 evaluates the presented data to determine the action required. In decision box 48, a determination is made on whether or not the presented data constitutes a programming function. If a programming function is detected, box 50 is illustrative of the execution of the required function. During the execution of the function, remote wireless communicator 22 is typically turned ON. Numerous functions are possible such as the transmitting of the transaction log of remote access control system 14 to central access control system 12, requesting new user programming data including, but not limited to, schedules, codes and credentials via wireless link 40, etc. After the function of box 50 is completed, the device will return to its sleep mode as represented by box 52.

If, instead of a function, decision box 48 determines that an access request signal has been received, remote access controller 21 will check remote storage device 28 to compare the access request signal to stored valid access request signals to determine whether a valid access request has been received. This function is represented in box 54 and decision box 56. If the presented credential represents an authorized user, remote access controller 21 will forward an appropriate status signal to control circuit 30 which, in turn, will unlock locking mechanism 32. Moreover, the entry will be logged, and any additional functions will be executed as reflected in box 58. After access has been made, and all files are updated accordingly, the device will return to its sleep mode as reflected in box 52. If the access request signal from credential 38 does not represent a valid access request, the system will check an update frequency timer, as represented in box 60, to determine the last time that remote storage device 28 was updated, to determine if new data is warranted. If repeated requests by that user had recently been made, access will be denied and the memory log will be updated accordingly. These steps are reflected in box 62 and 64.

In prior art systems, such as in the '861 patent, if decision box 56 determined that the presented credential did not reflect a valid access request signal, access would simply be denied. However, in the present invention, if decision box 62 determines that it is permissible to obtain an update from central access control system 12, remote access control 14 will request an update from central access control system 12 by sending a request from remote wireless communicator 22 to central wireless communicator 18. This step requires the powering ON of remote wireless communicator 22 as reflected in box 66. Box 68 reflects the steps of remote access control system 14 updating its updated frequency timer, to help determine if repeated request and updates have been requested. This step is reflected in box 68. Box 70 reflects the updating of remote access controller 21 by central access control system 12. At this point, the request is reevaluated. If the request is valid, as reflected in box 72, entry is permitted and the other steps of aforementioned box 58 are completed. Alternatively, if, even upon re-evaluation, the request represents an unauthorized user, entry is denied and the log is updated in an appropriate fashion as reflected in aforementioned box 64.

Based on the aforementioned description, it should be understood that the update frequency timer is to prevent a situation wherein the users might continually request access in an inappropriate manner, which could result in undue battery consumption. When credential 38 is presented to access request receiving device 24, access will be promptly permitted from remote access control system 14 if the presented access request data matches data in remote storage device 28. Conversely, if, initially, the access request signal does not reflect a valid access request when compared in remote access controller 28, wireless access control system 10 will check with central access control system 12 to determine if any updates of access control data are available from central access control system 12. This functionality prevents the denial of entry to recently added authorized users.

Remote wireless communicator 22, as utilized in the present invention, can be understood to have three different modes. In its standby (or sleep) mode, no access control data can be received or transmitted. In its transmission mode, access control data can be either transmitted or received. The third mode of remote wireless communicator 22 is its wake-up listening mode wherein its receiver is activated, but its transmitter is not. The wake-up listening mode can be preset with the help of timer 36 to enable specific periods of time during which central access control system 12 can forward updated control data to remote access control system 14. This pre-arranged wake-up listening mode method is described in FIG. 3. Timer 36 is checked in box 74. As reflected in decision box 76, a determination is made on whether or not timer 36 has expired. If timer 36 has not expired, remote wireless communicator will remain in its sleep mode as reflected in box 78. Alternatively, if the preset time, as programmed in timer 36, has been reached, remote access control system 14 is turned ON and activates the receiver of remote wireless communicator 22. Remote wireless communicator 22 will maintain its receiver ON for a pre-determined period of time while awaiting communications from central wireless communicator 18 of central access control system 12 (box 80). A determination will be made on whether a communication from central wireless communicator 18 had been received (box 82). If a communication had indeed been received, a determination will also be made on whether a further delay was requested (box 84). If no further delay was requested, central access control system 12 will execute programming functions, log uploading or other maintenance functions, etc. via wireless link 40 (box 86). At this point, timer 36 will be updated (box 88) and the unit will be placed back into its standby (or sleep) mode (box 78). If a delay to send a communication was requested at box 84, timer 38 would simply be updated (box 88) and remote wireless communicator 22 would be placed back in its standby (or sleep) mode.

If no communication is received by remote wireless communicator 22 after it is placed in its wake-up listening mode, remote access control system will check to determine if the time for receiving any updated data or function information is expired (box 90) If the time is not expired, the system will repeatedly look for such updated data; once the time has expired, remote wireless communicator 22 will be placed back in its sleep (or standby) mode (box 92).

The present invention also provides for another possible means of placing remote wireless communicator 22 into its wake-up listening mode. Transducer 34 can be activated by transducer stimulator 20 along wireless transmission lines 42 to ultimately activate remote wireless communicator 22 into its wake-up standby mode. Transducer 34 can be operable based on audio, ultrasonic, infrared, RF, or other signals, and via modulation, modification or ON-OFF keying of these transmission media, impart a command to remote access control system 14 independent of the communication scheme previously described. Moreover, audio tones or DTMF digits can be amplified over a public address system to command remote access control system 14 to perform a function. These tones can be varied to provide immunity to tampering. Such an enhancement is useful in lock-down situations in schools, etc.

The utilization of transducer stimulator 21 and transducer stimulator 34 to place remote wireless communicator 22 into its wake-up listening mode is described best by following the flow chart presented in FIG. 4. If transducer 34 is stimulated (box 94), a determination is made by remote access controller 21 to determine if the stimulation is an appropriate signal (box 96). If the stimulation is inappropriate, remote wireless communicator 22 remains in its sleep mode (box 98). If, conversely, transducer 34 is indeed activated by an appropriate signal from transducer stimulator 21, remote wireless communicator 22 is placed in its wake-up listening mode (box 100). A determination is then made on whether remote wireless communicator 22 needs to be powered ON to its transmission mode (box 102). If no communication from remote access control system 14 to central access control system 12 is required, a determination is made on whether or not the requested programming requires a specific command to be executed (box 104). If no command is required, the unit is placed back in its standby (or sleep) mode (box 98). Conversely, if a command is required, remote access controller 21 executes the program functions (box 106) before the unit is placed back into its standby (or sleep) mode.

If decision box 102 determined that remote wireless communicator 22 should be placed in its transmission mode, it will be placed in such a mode, and central access control system 12 will execute all required programming functions, log uploading or other maintenance functions via wireless link 40 (box 108). After all functions are completed, the unit will again be placed in its standby (or sleep) mode (box 98).

It will be apparent from the foregoing description that the present invention incorporates various new components to a demand based access control system. These elements can be combined in various formulations. For instance, if timer 36 is incorporated to arrange for remote wireless communicator 22 to be placed in its wake-up listening mode, it may not be necessary to also incorporate transducer 34. However, in certain instances, it may be desirable to include both means for placing remote wireless communicator 22 into its wake-up listening mode. Moreover, although the aforementioned description mentions that remote access control system 14 could be placed on a door, such access control can be extended to other types of controls such as on locking mechanisms to control the ignition of vehicles, the operation of power tools, access to telecommunication equipment, and access to a computer network. Moreover, although specific interconnections of power sources have not been provided, it can be readily understood that various components can be powered by AC/DC power, batteries, or both.

While there has been shown and described what is presently considered to be the preferred embodiments of this invention, it will be obvious to those skilled in the art that various changes and modifications may be made without departing from the broader aspects of this invention. It is, therefore, aimed in the appended claims to cover all such changes and modifications as fall within the true scope and spirit of the invention.

I claim:

1. A demand-based authorization method for controlling access to a plurality of lock mechanisms in a wireless access control system having a central access control system comprising a central access controller and a central wireless communicator, and having a separate remote access control system connected to each of said plurality of lock mechanisms comprising a remote access controller, a remote credential reader and a remote wireless communicator maintained in a standby mode to conserve power until activated, wherein said method comprises the steps of:

storing a list of valid credentials in a memory at said remote access control system wherein said list is indicative of authorized users;

receiving a credential at said credential reader;

comparing said credential to said list of valid credentials;

authorizing access from said remote access control system if said comparing step is indicative of an authorized user;

activating said remote wireless communicator to initiate a wireless communication between said remote wireless communicator and central wireless communicator when said comparing step is not indicative of an authorized user to obtain an updated list of valid credentials;

re-comparing said credential to said updated list of valid credentials; and authorizing access if said re-comparing step is indicative of an authorized user.

2. The demand-based authorization method of claim 1 whereby said central access control system further comprises a transducer stimulator and each said separate remote access control system comprises a transducer, said method further comprising the step of:

activating said remote wireless communicator by means of a signal from said transducer stimulator to said transducer.

3. The demand-based authorization method of claim 2 further comprising the step of:

forwarding access control data from said central access control system to said remote access control system.

4. The demand-based authorization method of claim 2 further comprising the step of:

amplifying said signal from said transducer stimulator over a public address system.

5. The demand-based authorization method of claim 1 further comprising the steps of:

activating said remote wireless communicator at predetermined times for a period of time; and initiating a wireless communication of access control data from said central access control system to said remote access control system during said period of time that said remote wireless communicator is activated.

6. The demand-based authorization method of claim 5 further comprising the step of:

extending said period of time that said remote wireless communicator is activated if transmission of access control data from said central access control system to said remote access control system is not completed.

7. The demand-based authorization method of claim 1 further comprising the step of:

activating said remote wireless communicator by means of a programming mode signal entered at said remote access control system.

* * * * *